United States Patent
Itoh

(10) Patent No.: US 9,219,270 B2
(45) Date of Patent: Dec. 22, 2015

(54) FLAT PRIMARY BATTERY, NEGATIVE ELECTRODE MIXTURE FOR FLAT PRIMARY BATTERY, AND METHOD FOR MANUFACTURING FLAT PRIMARY BATTERY

(71) Applicant: Seiko Instruments Inc., Chiba-shi, Chiba (JP)

(72) Inventor: Mitsunori Itoh, Chiba (JP)

(73) Assignee: SEIKO INSTRUMENTS INC., Chiba-Shi, Chiba (JP)

( * ) Notice: Subject to any disclaimer, the term of this patent is extended or adjusted under 35 U.S.C. 154(b) by 317 days.

(21) Appl. No.: 13/793,303

(22) Filed: Mar. 11, 2013

(65) Prior Publication Data

US 2013/0295438 A1 Nov. 7, 2013

(30) Foreign Application Priority Data

May 2, 2012 (JP) ................. 2012-105459

(51) Int. Cl.
| | |
|---|---|
| H01M 4/06 | (2006.01) |
| H01M 6/12 | (2006.01) |
| H01M 4/42 | (2006.01) |
| H01M 4/12 | (2006.01) |
| H01M 4/62 | (2006.01) |

(52) U.S. Cl.
CPC ............ *H01M 4/06* (2013.01); *H01M 4/12* (2013.01); *H01M 4/42* (2013.01); *H01M 4/622* (2013.01); *H01M 4/623* (2013.01); *H01M 6/12* (2013.01); *Y10T 29/4911* (2015.01)

(58) Field of Classification Search
CPC .......................... H01M 2/0207; H01M 10/24
See application file for complete search history.

(56) References Cited

U.S. PATENT DOCUMENTS

2007/0231703 A1* 10/2007 Ohtani et al. ............... 429/300

FOREIGN PATENT DOCUMENTS

| JP | 2010-044906 | * | 1/2010 |
|---|---|---|---|
| JP | 2010-044906 A | | 2/2010 |
| WO | WO 02/01654 A2 | | 1/2002 |

OTHER PUBLICATIONS

English translation of JP2010-044906 published Feb. 25, 2010.*
Extended European Search Report for European Application No. 13166118.3, dated Aug. 7, 2013, 5 pages.

* cited by examiner

*Primary Examiner* — Stewart Fraser
*Assistant Examiner* — Olatunji Godo
(74) *Attorney, Agent, or Firm* — Brinks Gilson & Lione; G. Peter Nichols

(57) ABSTRACT

A flat primary battery capable of enhancing the productivity and a method for manufacturing the same are disclosed. The flat primary battery is a flat alkaline primary battery including a positive electrode mixture, a negative electrode mixture, and an electrolytic solution in a can, wherein the negative electrode mixture includes a zinc powder or a zinc alloy powder and an insulating powder of a non-metal which does not react with an electrolytic solution and which has an average particle diameter of 110 μm or more, the value of which is from 60% to 140% of an average particle diameter of the zinc powder or zinc alloy powder.

10 Claims, 3 Drawing Sheets

Fig. 3

| | Average particle diameter of zinc alloy powder (μm) | Resin powder | | | Average particle diameter of resin powder relative to average particle diameter of zinc alloy powder (%) | Shape | | | | Number of occurrence of mounting failure | | | | Coefficient of variation of discharge capacity | | | |
|---|---|---|---|---|---|---|---|---|---|---|---|---|---|---|---|---|---|
| | | Type | Blending ratio (% by volume) | Average particle diameter (μm) | | Operating time (h) | | | | Operating time (h) | | | | Operating time (h) | | | |
| | | | | | | From 0 to 1 | From 1 to 2 | From 2 to 3 | From 3 to 4 | From 0 to 1 | From 1 to 2 | From 2 to 3 | From 3 to 4 | From 0 to 1 | From 1 to 2 | From 2 to 3 | From 3 to 4 |
| Example 1 | 150 | PE | 2.8 | 150 | 100 | Favorable | Favorable | Favorable | Favorable | 0 | 0 | 0 | 0 | 0.8 | 0.9 | 1.0 | 1.0 |
| Example 2 | 100 | PE | 2.8 | 110 | 110 | Favorable | Favorable | Favorable | Favorable | 0 | 0 | 0 | 0 | 0.9 | 0.9 | 0.8 | 0.8 |
| Example 3 | 150 | PE | 2.8 | 110 | 73 | Favorable | Favorable | Favorable | Favorable | 0 | 0 | 0 | 1 | 1.0 | 0.9 | 1.0 | 0.9 |
| Example 4 | 150 | PE | 2.8 | 210 | 140 | Favorable | Favorable | Favorable | Favorable | 0 | 0 | 0 | 0 | 1.2 | 1.1 | 1.3 | 1.2 |
| Example 5 | 250 | PE | 2.8 | 150 | 60 | Favorable | Favorable | Favorable | Favorable | 0 | 0 | 0 | 1 | 1.1 | 0.9 | 1.0 | 1.1 |
| Example 6 | 250 | PE | 2.8 | 350 | 140 | Favorable | Favorable | Favorable | Favorable | 0 | 0 | 0 | 0 | 1.1 | 1.2 | 1.2 | 1.0 |
| Example 7 | 150 | PP | 2.8 | 150 | 100 | Favorable | Favorable | Favorable | Favorable | 0 | 0 | 0 | 0 | 0.7 | 0.8 | 0.9 | 0.9 |
| Example 8 | 150 | PA | 2.8 | 150 | 100 | Favorable | Favorable | Favorable | Favorable | 0 | 0 | 0 | 0 | 0.9 | 0.9 | 0.9 | 0.9 |
| Example 9 | 150 | PTFE | 2.8 | 150 | 100 | Favorable | Favorable | Favorable | Favorable | 0 | 0 | 0 | 0 | 0.8 | 1.0 | 1.0 | 0.9 |
| Example 10 | 150 | PMMA | 2.8 | 150 | 100 | Favorable | Favorable | Favorable | Favorable | 0 | 0 | 0 | 0 | 0.8 | 0.8 | 1.0 | 1.0 |
| Example 11 | 150 | PE | 1.0 | 150 | 100 | Favorable | Favorable | Favorable | Favorable | 0 | 0 | 1 | 2 | 1.0 | 1.0 | 0.9 | 0.8 |
| Example 12 | 150 | PE | 25.0 | 150 | 100 | Favorable | Favorable | Favorable | Favorable | 0 | 0 | 0 | 1 | 1.0 | 1.0 | 0.9 | 1.0 |
| Comparative Example 1 | 150 | Not added | - | - | - | Favorable | Favorable | Collapsed | - | 6 | 8 | - | - | 2.4 | 2.9 | - | - |
| Comparative Example 2 | 100 | PE | 2.8 | 60 | 60 | Favorable | Favorable | Favorable | Collapsed | 1 | 5 | 8 | - | 1.1 | 2.2 | 2.7 | - |
| Comparative Example 3 | 150 | PE | 2.8 | 30 | 20 | Favorable | Favorable | Collapsed | - | 5 | 6 | - | - | 1.7 | 2.0 | - | - |
| Comparative Example 4 | 150 | PE | 2.8 | 270 | 180 | Favorable | Favorable | Favorable | Favorable | 0 | 0 | 1 | 2 | 3.2 | 2.7 | 3.3 | 3.7 |
| Comparative Example 5 | 250 | PE | 2.8 | 50 | 20 | Favorable | Favorable | Collapsed | - | 3 | 5 | - | - | 1.9 | 2.4 | - | - |
| Comparative Example 6 | 250 | PE | 2.8 | 450 | 180 | Favorable | Favorable | Favorable | Favorable | 0 | 0 | 1 | 3 | 3.3 | 3.1 | 3.5 | 3.7 |
| Comparative Example 7 | 150 | PE | 0.5 | 150 | 100 | Favorable | Favorable | Collapsed | - | 3 | 6 | - | - | 2.1 | 2.5 | - | - |
| Comparative Example 8 | 150 | PE | 27.0 | 150 | 100 | Favorable | Collapsed | - | - | 0 | - | - | - | 2.9 | - | - | - |

FLAT PRIMARY BATTERY, NEGATIVE ELECTRODE MIXTURE FOR FLAT PRIMARY BATTERY, AND METHOD FOR MANUFACTURING FLAT PRIMARY BATTERY

RELATED APPLICATIONS

This application claims priority under 35 U.S.C. §119 to Japanese Patent Application No. 2012-105459 filed on May 2, 2012, the entire content of which is hereby incorporated by reference.

BACKGROUND OF THE INVENTION

1. Field of the Invention

The present invention relates to a flat primary battery, a negative electrode mixture for flat primary battery, and a method for manufacturing a flat primary battery.

2. Description of the Related Art

With the advance of high performance and price reduction in small-sized electronic equipment, flat primary batteries such as coin-shaped batteries and button-shaped batteries, which are used for small-sized electronic equipment such as electronic wrist watches and portable electronic calculators, are required to achieve, in addition to the advance of high performance and price reduction, an enhancement of the productivity.

As such a flat primary battery, alkaline button batteries using manganese dioxide for a positive electrode and a zinc powder in a gel state for a negative electrode, silver oxide batteries using silver oxide for a positive electrode and a zinc powder in a gel state for a negative electrode, and the like are known. These batteries are formed by caulking a positive electrode can filled with a positive electrode mixture and a negative electrode can filled with a negative electrode mixture via a separator.

In such a flat primary battery, a ratio of an active material in the positive electrode mixture or negative electrode mixture is adjusted depending upon an electric capacity required for the size of each battery. In the negative electrode mixture in a gel state using zinc or a zinc alloy, the ratio of the active material is adjusted by including an insulating powder of a non-metal which does not react with an electrolytic solution (see, for example, Patent Document 1). Patent Document 1: JP-A-2010-044906

SUMMARY OF THE INVENTION

However, in the negative electrode mixture in a gel state using zinc or a zinc alloy, in the case where a particle diameter of the insulating powder of a non-metal which does not react with an electrolytic solution, there was involved such a problem that at the time of molding the negative electrode mixture, this insulating powder attaches to a supply pin, so that it may be impossible to normally supply the negative electrode mixture.

In order to solve the foregoing problem, the present invention has been made, and an object thereof is to provide a flat primary battery capable of enhancing the productivity, a negative electrode mixture for flat primary battery, and a method for manufacturing a flat primary battery.

As means for solving the foregoing problem, the present invention has the following configurations.

The present invention is concerned with a flat primary battery comprising a negative electrode mixture in a gel state and an electrolytic solution in a can, wherein the negative electrode mixture includes a zinc powder or a zinc alloy powder, a gelling agent, and an insulating powder of a non-metal which does not react with the electrolytic solution and which has an average particle diameter of from 60% to 140% of an average particle diameter of the zinc powder or zinc alloy powder, and the average particle diameter of the insulating powder is 110 µm or more.

According to this configuration, in addition to the gelling agent, the insulating powder of the non-metal which does not react with the electrolytic solution is blended, and therefore, even when the ratio of the gelling agent is increased, the viscoelasticity of the negative electrode mixture can be suitably adjusted. In addition, the average particle diameter of the insulating powder is from 60% to 140% of the average particle diameter of the zinc powder or zinc alloy powder and is 110 µm or more, a weighing scattering of the negative electrode mixture can be suppressed. According to this, the handling properties and productivity in a battery assembling step can be enhanced while keeping the electric capacity of the battery at a necessary capacity, and a scattering of the electric capacity can be suppressed.

In this flat primary battery, the gelling agent includes carboxymethyl cellulose or polyacrylic acid, or a mixture thereof.

According to this configuration, the viscoelasticity of the negative electrode mixture can be suitably adjusted.

In this flat primary battery, the average particle diameter of the insulating powder is not more than 350 µm.

According to this configuration, even when the ratio of the insulating powder is increased, at the time of molding the negative electrode mixture, this insulating powder scarcely attaches to a supply pin, and the productivity of the flat primary battery can be enhanced.

In this flat primary battery, the insulating powder has water repellency.

According to this configuration, the insulating powder has water repellency, and therefore, even when the ratio of the carboxymethyl cellulose or polyacrylic acid, or the mixture thereof is increased, the viscoelasticity of the negative electrode mixture can be adjusted to viscoelasticity at which favorable handling properties are obtained.

In this flat primary battery, the insulating powder is composed of a resin powder of any one or a plural number of polytetrafluoroethylene, polypropylene, a polyamide, polyethylene, and an acrylic resin.

According to this configuration, the insulating powder is composed of a resin powder of any one or a plural number of polytetrafluoroethylene, polypropylene, a polyamide, polyethylene, and an acrylic resin, and therefore, the viscoelasticity of the negative electrode mixture can be suitably adjusted.

In this flat primary battery, the negative electrode mixture includes from 1% by volume to 25% by volume of the insulating powder.

According to this configuration, the negative electrode mixture includes from 1% by volume to 25% by volume of the insulating powder, and therefore, favorable handling properties are obtainable while keeping the electric capacity of the battery at a necessary capacity.

The present invention is also concerned with a negative electrode mixture for flat primary battery comprising a zinc powder or a zinc alloy powder, a gelling agent, and an insulating powder of a non-metal which does not react with an electrolytic solution, wherein an average particle diameter of the insulating powder is 110 µm or more and is from 60% to 140% of an average particle diameter of the zinc powder or zinc alloy powder.

According to this configuration, in addition to the gelling agent, the insulating powder of the non-metal which does not react with the electrolytic solution is blended, and therefore, even when the ratio of the gelling agent is increased, the viscoelasticity of the negative electrode mixture can be suitably adjusted. In addition, the average particle diameter of the insulating powder is 110 μm or more and is from 60% to 140% of an average particle diameter of the zinc powder or zinc alloy powder, a weighing scattering of the negative electrode mixture can be suppressed. According to this, the handling properties and productivity in a battery assembling step can be enhanced while keeping the electric capacity of the battery at a necessary capacity, and a scattering of the electric capacity can be suppressed.

The present invention is also concerned with a method for manufacturing a flat primary battery comprising a step of filling a positive electrode mixture in a positive electrode can, laying a separator on the positive electrode mixture, and press fitting a gasket; and a step of mounting a molded negative electrode mixture on the separator, putting a negative electrode can thereon, and caulking an opening edge of the positive electrode can to achieve sealing, wherein the negative electrode mixture includes a zinc powder or a zinc alloy powder, a gelling agent, and an insulating powder of a non-metal which does not react with an electrolytic solution and which has an average particle diameter of from 60% to 140% of an average particle diameter of the zinc powder or zinc alloy powder, and the average particle diameter of the insulating powder is 110 μm or more.

According to this configuration, in addition to the gelling agent, the insulating powder of the non-metal which does not react with the electrolytic solution is blended, and therefore, even when the ratio of the gelling agent is increased, the viscoelasticity of the negative electrode mixture can be suitably adjusted. In addition, the average particle diameter of the insulating powder is 110 μm or more and is from 60% to 140% of an average particle diameter of the zinc powder or zinc alloy powder, a weighing scattering of the negative electrode mixture can be suppressed. According to this, the handling properties and productivity in a battery assembling step can be enhanced while keeping the electric capacity of the battery at a necessary capacity, and a scattering of the electric capacity can be suppressed.

The flat primary battery, the negative electrode mixture for flat primary battery, and the method for manufacturing a flat primary battery according to the present invention are able to enhance the handling properties and productivity in a battery assembling step while keeping the electric capacity of the battery at a necessary capacity.

BRIEF DESCRIPTION OF THE DRAWINGS

FIG. 3 is a table of Examples and Comparative Examples.

DETAILED DESCRIPTION OF THE PREFERRED EMBODIMENTS

An embodiment in which the present invention is embodied is hereunder described by reference to FIG. 1.

Figure 1:
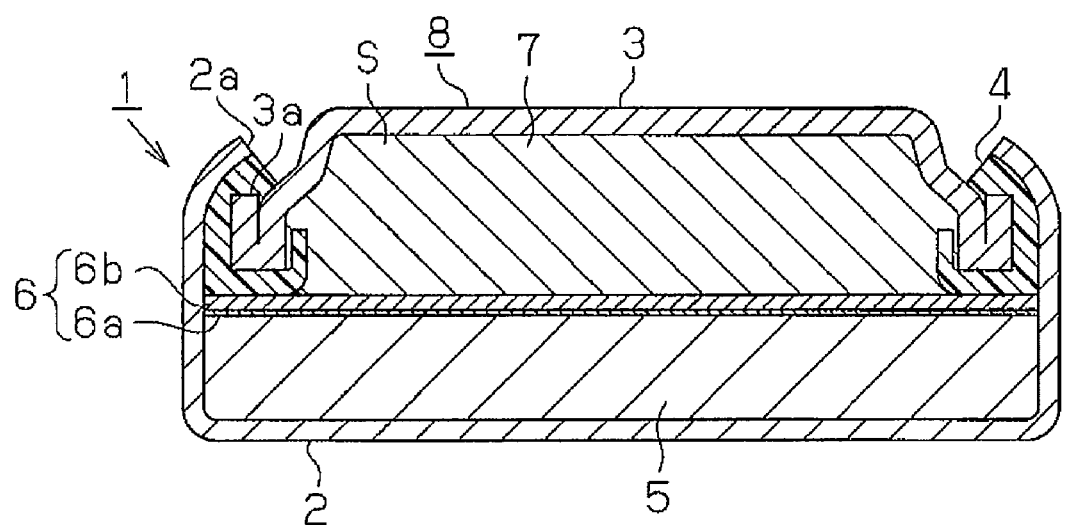
FIG. 1 is a cross-sectional view of a flat alkaline primary battery.

FIG. 1 is a diagrammatic cross-sectional view of a flat alkaline primary battery having a positive electrode mixture, a negative electrode mixture, and an electrolytic solution housed in a flat case. In FIG. 1, a flat alkaline primary battery 1 is a button-shaped primary battery and includes a positive electrode can 2 and a negative electrode can 3. The positive electrode can 2 is composed of a material prepared by plating stainless steel (SUS) with nickel and molded into a cup form. This positive electrode can 2 houses a positive electrode mixture 5 therein and also functions as a positive electrode terminal.

The negative electrode can 3 is composed of a clad material of a three-layer structure including an outer surface layer made of nickel, a metal layer made of stainless steel (SUS), and a collector layer made of copper and molded into a cup form. In addition, in the negative electrode can 3, its circular opening 3a is formed in a folded state, and the opening 3a is installed with, for example, a nylon-made gasket 4 in a ring shape.

Then, the negative electrode can 3 is engaged in the circular opening 2a of the positive electrode can 2 from the side of opening 3a having the gasket 4 installed therewith, and the opening 2a of the positive electrode can 2 is caulked and sealed toward the gasket 4, thereby forming a case 8 in a disc shape (button shape or coin shape). A sealed space S is formed in the inside of the case 8.

In this sealed space S, the positive electrode mixture 5, a separator 6, and a negative electrode mixture 7 are housed, and the positive electrode mixture 5 and the negative electrode mixture 7 are disposed on the side of the positive electrode can 2 and on the side of the negative electrode can 3, respectively across the separator 6.

At the time of assembling this flat alkaline primary battery 1, the positive electrode mixture 5 molded in a pellet form is filled in the positive electrode can 2. Then, the negative electrode mixture 7 in a gel state is mounted on the separator 6, and the negative electrode can 3 is put thereon. Furthermore, an opening edge of the positive electrode can 2 is caulked to seal the case 8.

The positive electrode mixture 5 includes a positive electrode active material, a conductive agent, an electrolytic solution, a binder, and the like. As for the positive electrode active material, in the case of using zinc or a zinc alloy as a negative electrode active material, any materials are useful without particular limitations so far as they can be used as the positive electrode active material. For example, the positive electrode active material may be a silver oxide granule or a manganese dioxide powder, or a mixture thereof In addition, the positive electrode active material may be nickel oxyhydroxide alone, or nickel oxyhydroxide having cobalt or the like solid-solved therein, or the like.

The negative electrode mixture 7 includes a negative electrode active material, a conductivity stabilizer, a gelling agent, an electrolytic solution, and a viscoelasticity adjustor.

As for the negative electrode active material, a zinc powder or zinc alloy powder 11 is used. As for the conductivity stabilizer, zinc oxide (ZnO) and the like can be used. In addition, as for the gelling agent, carboxymethyl cellulose or polyacrylic acid, or a mixture of carboxymethyl cellulose and polyacrylic acid is preferable. By using carboxymethyl cellulose or polyacrylic acid, the lyophilicity and liquid retentivity of the negative electrode mixture 7 with the electrolytic solution can be enhanced.

As for the electrolytic solution, a potassium hydroxide aqueous solution or a sodium hydroxide aqueous solution, or a mixed solution thereof can be used.

The viscoelasticity adjustor is blended for the purposes of adjusting the viscoelasticity of the negative electrode mixture 7 to viscoelasticity at which favorable handling properties are obtained and enhancing the productivity. As for this viscoelasticity adjustor, an insulating powder 10 of a non-metal which does not react with the electrolytic solution that is strongly alkaline is used. Here, a state where neither chemical reaction with the electrolytic solution nor absorption of the electrolytic solution is caused is defined as the state where the material does not react with the electrolytic solution.

For example, in the case of designing the battery so as to make the necessary electric capacity of the battery low and to make the ratio of the negative electrode active material small, the ratio of the zinc powder or zinc alloy powder 11 becomes small, and therefore, the ratio of the gelling agent with high viscosity or the electrolytic solution becomes high in correspondence thereto. However, by adding the insulating powder 10, a volume ratio of the solids (the zinc powder or zinc alloy powder and the insulating powder) and the electrolytic solution-containing gelling agent is favorably adjusted, whereby the viscoelasticity of the negative electrode mixture 7 can be adjusted to a favorable range.

For example, at the time of mounting a prescribed amount of the negative electrode mixture 7 on the separator, an assembling apparatus formed with a round hole of a prescribed volume is filled with the negative electrode mixture 7 while giving a pressure, and the top and bottom of the round hole are leveled out using a leveling tool or the like. Furthermore, the molded negative electrode mixture 7 is taken out from the round hole by using a supply pin 13. In the case of the insulating powder-containing negative electrode mixture 7, the sharpness of the negative electrode mixture 7 is enhanced. Therefore, the negative electrode mixture 7 easily comes off and falls from the inner periphery of the round hole or the supply pin 13, and the handling of the negative electrode mixture 7 becomes easy, so that the handling properties can be enhanced. In addition, in the negative electrode mixture 7, a scattering at the time of leveling out a certain amount thereof, a mounting scattering at the time of mounting it on the separator, and a weighing scattering are suppressed, so that the productivity is enhanced.

It is preferable that an average particle diameter of this insulating powder 10 is from 60% to 140% of an average particle diameter of the zinc powder or zinc alloy powder 11. Incidentally, the average particle diameter as referred to herein means a particle diameter (D50) which is corresponding to 50% of the accumulated value in a particle size distribution curve. When the average particle diameter of the insulating powder 10 is less than 60% of the average particle diameter of the zinc powder or zinc alloy powder 11, it may be impossible to obtain the effects as the viscoelasticity adjustor, so that the sufficient handling properties are not obtained. In addition, when the average particle diameter of the insulating powder 10 exceeds 140%, at the time of mixing the negative electrode active material, the conductivity stabilizer, the gelling agent, the electrolytic solution, and the viscoelasticity adjustor to fabricate the negative electrode mixture 7, the zinc powder or zinc alloy powder as the negative electrode active material is not uniformly dispersed, a scattering of the amount of the negative electrode active material contained in the negative electrode mixture 7 as leveled out becomes large, and a scattering of the electric capacity becomes large.

Figure 2A:
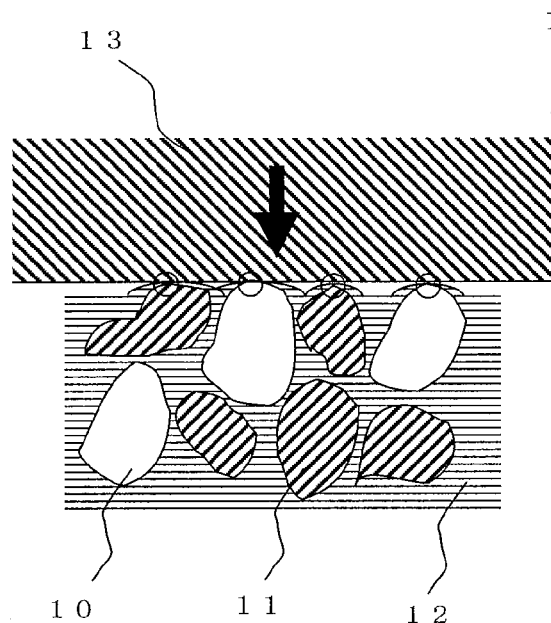
FIGS. 2A to 2D are each a schematic view showing any influences against the productivity in the case where an average particle diameter of an insulating powder is less than 110 μm.

FIGS. 2A to 2D are each a schematic view showing any influences against the productivity in the case where the average particle diameter of the insulating powder 10 is less than 110 μm. FIG. 2A is a view showing a state where a negative electrode mixture including the insulating powder 10 having an average particle diameter of 110 μm or more, the zinc powder or zinc alloy powder 11, and a mixture 12 of the gelling agent and the electrolytic solution is molded into a round column shape and extruded from a round hole. At the time when the supply pin 13 moves to an arrow direction and comes into contact with the negative electrode mixture, the mixture 12 of the gelling agent and the electrolytic solution attached onto the surroundings of the insulating powder 10 and the zinc powder or zinc alloy powder 11 comes into contact with the supply pin 13.

Figure 2B:
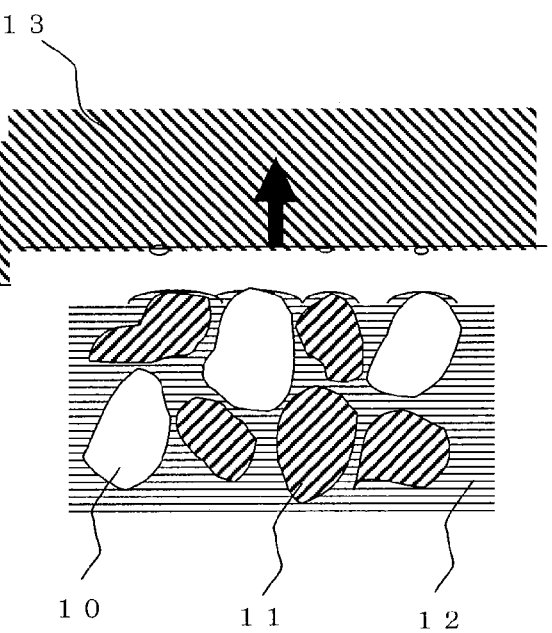

FIG. 2B is a view showing a state where this supply pin 13 moves to an arrow direction, and the negative electrode mixture comes off from the supply pin 13. In FIG. 2B, the negative electrode mixture comes off from the supply pin 13. Here, FIGS. 2A to 2D are based on the results obtained by performing a verification using carboxymethyl cellulose as the gelling agent and a sodium hydroxide aqueous solution and a potassium hydroxide aqueous solution as the electrolytic solution.

Figure 2C:
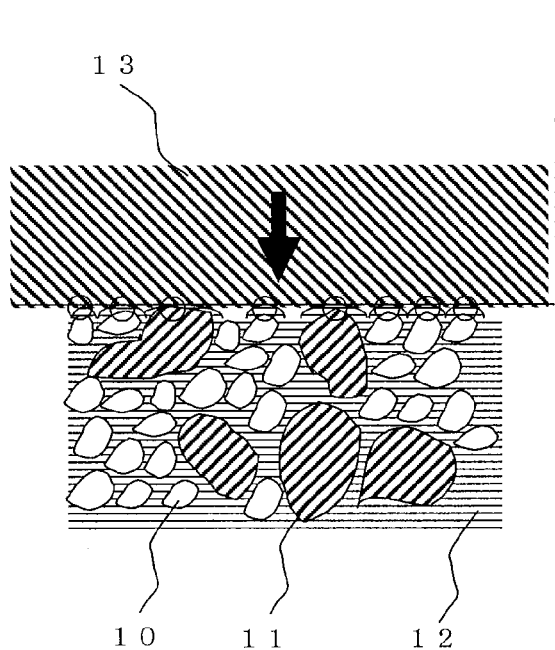

FIG. 2C is a view showing a state where a negative electrode mixture including the insulating powder 10 having an average particle diameter of less than 110 μm, the zinc powder or zinc alloy powder 11, and a mixture 12 of the gelling agent and the electrolytic solution is molded into a round column shape and extruded from a round hole. Similar to FIG. 2A, at the time when the supply pin 13 moves to an arrow direction and comes into contact with the negative electrode mixture, the mixture 12 of the gelling agent and the electrolytic solution attached onto the surroundings of the insulating powder 10 and the zinc powder or zinc alloy powder 11 comes into contact with the supply pin 13.

Figure 2D:
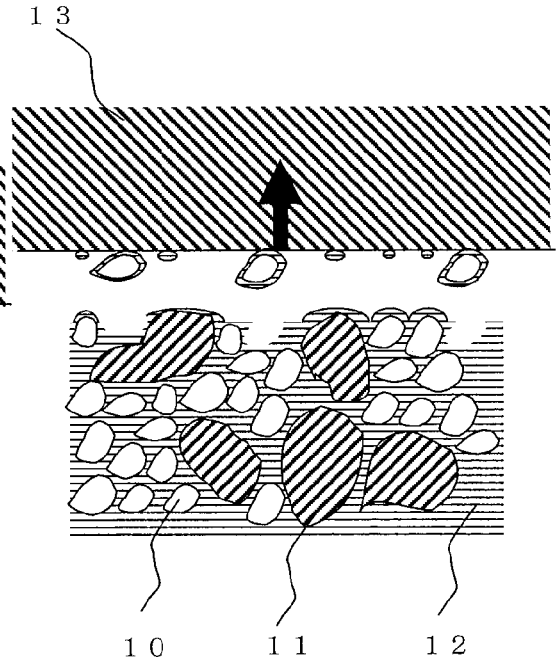

FIG. 2D is a view showing a state where the supply pin 13 moves to an arrow direction, and the negative electrode mixture comes off from the supply pin 13.

Here, attention is paid to a point at which the negative electrode mixture and the supply pin 13 come into contact with each other. In FIG. 2A, this contact point is present in four places (places marked with a circle), whereas in FIG. 2C, this contact point is present in eight places. Thus, it is understood that the contact point of FIG. 2C is present in more places than those in which the contact point of FIG. 2A is present. In addition, as for the particle diameter of the insulating powder 10, the case of FIGS. 2C and 2D is smaller than the case of FIGS. 2A and 2B. Accordingly, at the time of allowing the negative electrode mixture to come off from the supply pin, in the case where the average particle diameter of the insulating powder 10 is less than 110 μm, as shown in FIG. 2D, the insulating powder 10 attaches to the supply pin 13 as it stands. Accordingly, when the negative electrode mixture is repeatedly extruded, the negative electrode mixture attached to the supply pin 13 must be removed, so that the productivity is lowered. So far as the average particle diameter of the insulating powder 10 is 110 μm or more, as shown in FIG. 2B, the negative electrode mixture hardly attaches to the supply pin 13. Therefore, it is not necessary to remove the negative electrode mixture from the supply pin. Alternatively, even when it is necessary to remove the negative electrode mixture from the supply pin, the frequency of removal is extremely small as compared with that in the case where the average particle diameter of the insulating powder 10 is less than 110 μm. In addition, the average particle diameter of this insulating powder is preferably not more than 350 μm.

In addition, it is preferable that this insulating powder has water repellency. When the insulating powder having water repellency is used, an adhesion of the electrolytic solution and the gelling agent to the insulating powder is more reduced, and the sharpness at the time of weighing the negative electrode mixture 7 is enhanced.

In addition, in view of water repellency, purity, cost, easiness of pulverization (processability), alkali resistance, and the like, as for the insulating powder, it is preferable to use a resin power composed of any one or a plural number of polytetrafluoroethylene, polypropylene, a polyamide, polyethylene, and an acrylic resin.

Furthermore, it is preferable that a blending ratio of the insulating powder is from 1% by volume to 25% by volume relative to the negative electrode mixture 7. When the blending ratio of the insulating powder is less than 1% by volume, it may be impossible to obtain the effects as the viscoelasticity adjustor, so that the sufficient handling properties are not obtained. In addition, when the blending ratio of the insulating powder exceeds 25% by volume, the viscoelasticity of the negative electrode mixture 7 becomes excessively low, and the strength of the negative electrode mixture 7 is lowered. When the strength of the negative electrode mixture 7 is lowered, at the time when the negative electrode mixture 7 is mounted on the separator, the shape of the negative electrode mixture 7 collapses, so that a mounting failure is liable to occur.

Furthermore, it is preferable that the insulating powder is spherical. When the spherical insulating powder is used, a frictional force of the insulating powder with the electrolytic solution-containing gelling agent or the like becomes small, so that the sharpness of the negative electrode mixture 7 is more enhanced.

Next, working examples in which the composition of the negative electrode mixture 7 was changed were carried out, thereby verifying the effects of the present invention.

EXAMPLE 1

In the present Example, a nominal capacity of a flat alkaline primary battery of an SR626SW type (outer diameter: 6.8 mm, height: 2.6 mm, nominal capacity: 30 mAh) was reduced with a viscoelasticity adjustor by 10% in terms of a capacity, thereby fabricating a battery (nominal capacity: 27 mAh).

The viscoelasticity adjustor to be blended in the negative electrode mixture 7 was made to be a polyethylene powder, and its average particle size was made to be 150 μm. Furthermore, a blending ratio of each of components constituting the negative electrode mixture 7 was made to be 25.1% by volume for a zinc alloy powder, 1.3% by volume for zinc oxide (ZnO), 4.9% by volume for carboxymethyl cellulose, 53.8% by volume for a sodium hydroxide aqueous solution having a concentration of 28% by mass, 12.1% by volume of a potassium hydroxide aqueous solution having a concentration of 45% by mass, and polyethylene for 2.8% by volume, respectively. In addition, an average particle diameter of the zinc alloy powder was made to be 150 μm, and an average particle diameter of the polyethylene powder was made to be 100% relative to the average particle diameter of the zinc alloy powder. These components were mixed to fabricate the negative electrode mixture 7 in a gel state.

A blending ratio of each of components constituting the positive electrode mixture 5 was made to be 92% by mass for silver oxide ($Ag_2O$), 5% by mass for manganese dioxide, 2% by mass for graphite, and 1% by volume for lanthanum nickel ($LaNi_5$), respectively. Incidentally, an average particle diameter of silver oxide was made to be 10 μm, an average particle diameter of manganese dioxide was made to be 30 μm, an average particle diameter of graphite was made to be 15 μm, and an average particle diameter of lanthanum nickel was made to be 35 μm.

Then, these components were mixed and compression molded in a pellet form, thereby fabricating the positive electrode mixture 5. The thus fabricated positive electrode mixture 5 was housed in the iron-made positive electrode can 2 having been plated with nickel, and the separator 6 was laid from the top thereof. In addition, the gasket 4 in a ring shape to be press fitted was inserted into the positive electrode can 2. Furthermore, the negative electrode mixture 7 was mounted on the separator, and the negative electrode can 3 was put thereon via the gasket 4. Then, an opening edge of the positive electrode can 2 was caulked, thereby fabricating the flat alkaline primary battery 1 as described above.

Incidentally, the separator 6 was constituted of a polyethylene film, cellophane, and a nonwoven fabric, and the gasket 4 was made of a polyamide.

EXAMPLE 2

In Example 1, the average particle diameter of the zinc alloy powder was changed to 100 μm, and the average particle diameter of the polyethylene powder was changed to 110 μm, thereby making the average particle diameter of the polyethylene powder to be 100% relative to the average particle diameter of the zinc alloy powder. Other configuration was made identical with that in Example 1.

EXAMPLE 3

In Example 1, only the average particle diameter of the polyethylene powder was changed to 110 μm, thereby making the average particle diameter of the polyethylene powder to be 73% relative to the average particle diameter of the zinc alloy powder. Other configuration was made identical with that in Example 1.

EXAMPLE 4

In Example 1, only the average particle diameter of the polyethylene powder was changed to 210 μm, thereby making the average particle diameter of the polyethylene powder to be 140% relative to the average particle diameter of the zinc alloy powder. Other configuration was made identical with that in Example 1.

EXAMPLE 5

In Example 1, the average particle diameter of the zinc alloy powder was changed to 250 μm, and the average particle diameter of the polyethylene powder was changed to 150 μm, thereby making the average particle diameter of the polyethylene powder to be 60% relative to the average particle diameter of the zinc alloy powder. Other configuration was made identical with that in Example 1.

EXAMPLE 6

In Example 1, the average particle diameter of the zinc alloy powder was changed to 250 μm, and the average particle diameter of the polyethylene powder was changed to 350 μm, thereby making the average particle diameter of the polyethylene powder to be 140% relative to the average particle diameter of the zinc alloy powder. Other configuration was made identical with that in Example 1.

EXAMPLE 7

In Example 1, only the viscoelasticity adjustor to be added to the negative electrode mixture 7 was changed to polypropylene. Other configuration was made identical with that in Example 1.

EXAMPLE 8

In Example 1, only the viscoelasticity adjustor to be added to the negative electrode mixture 7 was changed to a polyamide. Other configuration was made identical with that in Example 1.

EXAMPLE 9

In Example 1, only the viscoelasticity adjustor to be added to the negative electrode mixture 7 was changed to polytetrafluoroethylene. Other configuration was made identical with that in Example 1.

EXAMPLE 10

In Example 1, only the viscoelasticity adjustor to be added to the negative electrode mixture 7 was changed to an acrylic resin. Other configuration was made identical with that in Example 1.

EXAMPLE 11

In Example 1, only the blending ratio of the polyethylene powder was changed to 1.0% by volume. Other configuration was made identical with that in Example 1.

EXAMPLE 12

In Example 1, only the blending ratio of the polyethylene powder was changed to 25.0% by volume. Other configuration was made identical with that in Example 1.

COMPARATIVE EXAMPLE 1

In Example 1, only the viscoelasticity adjustor was not added. Other configuration was made identical with that in Example 1.

COMPARATIVE EXAMPLE 2

In Example 1, the average particle diameter of the zinc alloy powder was changed to 100 μm, and the average particle diameter of the polyethylene powder was changed to 60 μm, thereby making the average particle diameter of the resin powder to be 60% relative to the average particle diameter of the zinc alloy powder. Other configuration was made identical with that in Example 1.

COMPARATIVE EXAMPLE 3

In Example 1, only the average particle diameter of the polyethylene powder was changed to 30 μm, thereby making the average particle diameter of the resin powder to be 20% relative to the average particle diameter of the zinc alloy powder. Other configuration was made identical with that in Example 1.

COMPARATIVE EXAMPLE 4

In Example 1, only the average particle diameter of the polyethylene powder was changed to 270 μm, thereby making the average particle diameter of the resin powder to be 180% relative to the average particle diameter of the zinc alloy powder. Other configuration was made identical with that in Example 1.

COMPARATIVE EXAMPLE 5

In Example 1, the average particle diameter of the zinc alloy powder was changed to 250 μm, and the average particle diameter of the polyethylene powder was changed to 50 μm, thereby making the average particle diameter of the resin powder to be 20% relative to the average particle diameter of the zinc alloy powder. Other configuration was made identical with that in Example 1.

COMPARATIVE EXAMPLE 6

In Example 1, the average particle diameter of the zinc alloy powder was changed to 250 μm, and the average particle diameter of the polyethylene powder was changed to 450 μm, thereby making the average particle diameter of the resin powder to be 180% to the average particle diameter of the zinc alloy powder. Other configuration was made identical with that in Example 1.

COMPARATIVE EXAMPLE 7

In Example 1, only the blending ratio of the polyethylene powder was changed to 0.5% by volume. Other configuration was made identical with that in Example 1.

COMPARATIVE EXAMPLE 8

In Example 1, only the blending ratio of the polyethylene powder was changed to 27.0% by volume. Other configuration was made identical with that in Example 1.

<Verification>

Then, the flat alkaline primary batteries 1 of Examples 1 to 12 and Comparative Example 1 to 8 were fabricated, and for the purpose of examining a change in shape at the time of mounting the negative electrode mixture 7, mounting properties, and a discharge capacity and a coefficient of variation thereof, the following verifications were performed.

<Verification 1>

After filling with the negative electrode mixture 7 by applying a prescribed pressure to a round hole having a prescribed volume, the negative electrode mixture 7 was taken out from the round hole using a pin in a round column shape, which is a little smaller than the round hole, while leveling out the top and bottom of the round hole. Then, the change in shape of the negative electrode mixture relative to the round hole was examined, and the presence or absence of the change in shape of each of the Examples and Comparative Examples. The results are shown in a table of FIG. 3. Here, the "operating time (h)" means an elapsed time from the commencement of operation of apparatus. The table shows the results from the commencement of operation until an elapse of one hour; and results from that point forward until an elapse of 4 hours at intervals of one hour. The symbol "–" shows that the negative electrode mixture completely collapsed, so that the round column shape could not be kept.

<Verification 2>

A battery assembling machine was operated for one hour, thereby fabricating the flat alkaline primary batteries 1 of Examples 1 to 12 and Comparative Examples 1 to 8. Then, the number of failures of the flat alkaline primary batteries to be caused due to a mounting shear of the negative electrode mixture 7 was examined. The results are shown in FIG. 3. The operating time is the same as that in Verification 1. The symbol "–" shows that the negative electrode mixture collapsed, so that the negative electrode mixture was in a state where it could not be mounted.

<Verification 3>

Five samples of each of the flat alkaline primary batteries 1 fabricated under each of the conditions of Examples 1 to 12 and Comparative Examples 1 to 8 were examined regarding a discharge capacity [mAh] by continuously discharging the battery at a load resistance of 30 kΩ and making a final voltage to be 0.9 V. Then, a coefficient of variation thereof [(standard deviation)/(average value)×100] was calculated, and a scattering in capacity to be caused due to a weighing scattering was examined. The results are shown in FIG. 3. The operating time is the same as that in Verification 1. The symbol "–" in the coefficient of variation of discharge capacity shows that the negative electrode mixture collapsed, so that the negative electrode mixture could not be mounted, and thus, a battery could not be fabricated.

<Review of Verification Results>

The comparison of Comparative Example 1 with Examples 1 to 12 reveals that in Comparative Example 1, the collapse of the shape occurred within from 2 to 3 hours after the commencement of operation. In addition, the mounting failure and the variation of discharge capacity occurred within one hour after the commencement of operation. Namely, it is understood that by adding the resin powder to the negative electrode mixture 7, the mounting scattering of the negative electrode mixture 7 can be reduced, and therefore, the productivity can be enhanced. This is because by adding an appropriate amount of the resin powder to the negative electrode mixture 7, the viscoelasticity of the negative electrode mixture 7 can be made in a favorable state. In addition, it is understood from the coefficient of variation of discharge capacity obtained in Verification 3 that by adding the resin powder to the negative electrode mixture 7, the scattering of the electric capacity can also be reduced. This is because by adding the resin powder having water repellency to the negative electrode mixture 7, the sharpness of the negative electrode mixture itself is enhanced, so that the weighing scattering can be reduced.

The comparison of Comparative Example 2 with Example 2 reveals that as for the mounting failure, in Comparative Example 2, the mounting failure occurred from the commencement of operation, whereas in Example 2, the mounting failure did not occur even after the operation for 4 hours. It is understood that as for the coefficient of variation of discharge capacity, Example 2 is also lower than Comparative Example 2. In addition, as for the shape, in Example 2, the shape was favorable even after the operation for 4 hours, whereas in Comparative Example 2, the collapse occurred within from 3 to 4 hours after the commencement of operation. It is understood from the foregoing that even when the particle diameter of the resin powder falls within the range of from 60 to 140% relative to the average particle size of the zinc alloy powder, by keeping the average particle diameter of the resin powder at 110 μm or more, the productivity can be enhanced.

The comparison of Comparative Examples 3 and 4 with Examples 3 and 4 reveals that as for the shape, in all of Examples 3 and 4, the shape was favorable even after the operation for 4 hours, whereas in Comparative Example 3, the collapse occurred within from 2 to 3 hours after the commencement of operation. As for the number of mounting failures, in Example 3, the mounting failure occurred in one case within from 3 to 4 hours after the commencement of operation, and in Example 4, the mounting failure did not occur even after the operation for 4 hours. On the other hand, in Comparative Example 3, the mounting failure occurred immediately after the commencement of operation, and in Comparative Example 4, the mounting failure occurred within from 2 to 3 hours after the commencement of operation. Namely, it is understood that by adjusting the particle diameter of the resin powder to the range satisfying the requirement that the average particle diameter of the resin powder is 110 μm or more, the mounting failure and the weighing scattering can be suppressed.

The comparison of Comparative Examples 5 and 6 with Examples 5 and 6 reveals that as for the shape, in all of Examples 5 and 6, the shape was favorable even after the operation for 4 hours, whereas in Comparative Example 5, the collapse occurred within from 2 to 3 hours after the commencement of operation. As for the number of mounting failures, in Example 5, the mounting failure occurred in one case within from 3 to 4 hours after the commencement of operation, and in Example 6, the mounting failure did not occur even after the operation for 4 hours. On the other hand, in Comparative Example 5, the mounting failure occurred immediately after the commencement of operation, and in Comparative Example 6, the mounting failure occurred within from 2 to 3 hours after the commencement of operation. Namely, it is understood that even in the case of changing the average particle diameter of the zinc alloy powder to 250 μm, by adjusting the average particle diameter of the resin powder relative to the average particle diameter of the zinc alloy powder so as to fall within the range of from 60 to 140%, the mounting failure and the weighing scattering can be suppressed.

Here, as the zinc powder or zinc alloy powder which is used for the negative electrode of the flat primary battery which is representative of a silver oxide battery, those having an average particle diameter of from 50 to 250 μm are generally used. When this average particle diameter is less than 50 μm, the surface area of zinc increases, and therefore, there is a concern that spontaneous combustion occurs in air, and the handling is difficult. Conversely, when the average particle diameter exceeds 250 μm, the surface area of zinc decreases, and therefore, when formed into a battery, the discharge characteristics are deteriorated. It is understood from Example 6 that a maximum value of the average particle diameter of this zinc powder or zinc alloy powder is 250 μm, and therefore, a maximum value of the average particle diameter of the resin powder is 250 μm ×140%=350 μm.

The comparison of Comparative Examples 7 and 8 with Examples 11 and 12 reveals that as for the shape, in all of Examples 11 and 12, the shape was favorable even after the operation for 4 hours, whereas in Comparative Example 7, the collapse occurred within from 2 to 3 hours after the commencement of operation, and in Comparative Example 8, the collapse occurred within from 1 to 2 hours after the commencement of operation. As for the number of mounting failures, in Example 11, the mounting failure occurred within from 2 to 3 hours after the commencement of operation, and in Example 12, the mounting failure occurred within from 3 to 4 hours after the commencement of operation. On the other hand, in Comparative Example 7, the mounting failure occurred immediately after the commencement of operation, and in Comparative Example 8, the mounting failure occurred within from 1 to 2 hours after the commencement of operation. Namely, it is understood that when the blending ratio of the resin powder is less than 1% by volume, the viscoelasticity of the negative electrode mixture increases, so that the resin powder does not play a role as the viscoelasticity adjustor. In addition, when the blending ratio of the resin powder exceeds 25% by volume, the amount of the resin powder in the negative electrode mixture was too large, so that the negative electrode mixture could not keep the shape even at low stress and collapsed. It is understood that in that case, the resin powder does not play a role as the viscoelasticity adjustor, too.

According to the foregoing embodiment, it is understood that the following effects are obtained.

(1) According to the foregoing embodiment, the negative electrode mixture 7 includes not only a zinc powder or a zinc alloy powder as a main negative electrode active material and a gelling agent but, as a viscoelasticity adjustor, an insulating powder of a non-metal which does not react with an electrolytic solution and which has an average particle diameter of 110 μm or more, the value of which is from 60% to 140% relative to an average particle diameter of the zinc powder or zinc alloy powder. Accordingly, even when the ratio of the gelling agent is large, by adding the insulating powder, it is possible to adjust the viscoelasticity of the negative electrode mixture 7. In consequence, it is possible to enhance the handling properties at the time of weighing and molding the negative electrode mixture 7 while keeping the electric capacity of the battery at a necessary capacity. In addition, a mounting scattering and a weighing scattering are suppressed, so that the productivity can be enhanced.

(2) According to the foregoing embodiment, the insulating powder which is blended as the viscoelasticity adjustor in the negative electrode mixture 7 is made to be a resin powder of any one or a plural number of polytetrafluoroethylene, polypropylene, a polyamide, polyethylene, and an acrylic resin. Accordingly, it is possible to adjust the viscoelasticity of the negative electrode mixture 7 by using a powder satisfying the requirements such as water repellency, cost, processability, and alkali resistance.

(3) According to the foregoing embodiment, the negative electrode mixture 7 includes from 1% by volume to 25% by volume of the insulating powder. Accordingly, favorable handing properties are obtained while keeping the electric capacity of the battery at a necessary capacity. Incidentally, the foregoing embodiment may be changed as follows.

In addition to an alkaline button battery using manganese dioxide as the positive electrode active material, a silver oxide battery using silver oxide as the positive electrode active material, and a battery using nickel oxyhydroxide as the positive electrode active material, as described above, the flat primary battery 1 may be formed into a zinc-air battery including an air electrode.

What is claimed is:

1. A flat primary battery comprising a negative electrode mixture in a gel state and an electrolytic solution in a can, wherein
   the negative electrode mixture includes a zinc powder or a zinc alloy powder, a gelling agent, and an insulating powder of a non-metal which does not react with the electrolytic solution, wherein the insulating powder is selected from the group consisting of polytetrafluoroethylene, polypropylene, a polyamide, polyethylene and mixtures thereof and wherein the insulating powder has an average particle diameter of from 60% to 140% of an average particle diameter of the zinc powder or zinc alloy powder, and
   the average particle diameter of the insulating powder is 110 μm or more.

2. The flat primary battery according to claim 1, wherein the gelling agent includes carboxymethyl cellulose or polyacrylic acid, or a mixture thereof.

3. The flat primary battery according to claim 1, wherein the average particle diameter of the insulating powder is not more than 350 μm.

4. The flat primary battery according to claim 2, wherein the average particle diameter of the insulating powder is not more than 350 μm.

5. The flat primary battery according to claim 1, wherein the insulating powder has water repellency.

6. The flat primary battery according to claim 2, wherein the insulating powder has water repellency.

7. The flat primary battery according to claim 3, wherein the insulating powder has water repellency.

8. The flat primary battery according to claim 4, wherein the insulating powder has water repellency.

9. The flat primary battery according to claim 1, wherein the negative electrode mixture includes from 1% by volume to 25% by volume of the insulating powder.

10. A negative electrode mixture for flat primary battery comprising a zinc powder or a zinc alloy powder, a gelling agent, and an insulating powder of a non-metal which does not react with an electrolytic solution, wherein, the insulating powder is selected from the group consisting of polytetrafluoroethylene, polypropylene, a polyamide, polyethylene and mixtures thereof and wherein an average particle diameter of the insulating powder is 110 μm or more and is from 60% to 140% of an average particle diameter of the zinc powder or zinc alloy powder.

* * * * *